US000001534H

United States Statutory Invention Registration [19]

[11] Reg. Number: H1534

Fritch

[45] Published: Jun. 4, 1996

[54] NOSE-DEPLOYED PARACHUTE RECOVERY MODULE FOR GUN FIRING AND SOFT RECOVERY OF FINNED PROJECTILES

[75] Inventor: Paul L. Fritch, Mine Hill, N.J.

[73] Assignee: The United States of America as represented by the Secretary of the Army, Washington, D.C.

[21] Appl. No.: 137,459

[22] Filed: Oct. 12, 1993

[51] Int. Cl.[6] ..... F42B 8/12; F42B 12/00

[52] U.S. Cl. ..... 102/473; 102/354; 102/498

*Primary Examiner*—Harold J. Tudor

*Attorney, Agent, or Firm*—Anthony T. Lane; Edward Goldberg; Michael C. Sachs

[57] ABSTRACT

A gun fired, artillery projectile and parachute recovery system for fin-stabilized, non-spinning projectiles. It has a a cylindrical payload with several fins mounted at its rear end and a conical nose section attached on the front end. The nose section has a base attached to a hollow windshield by frangible shear pins. The windshield encloses a parachute housing containing a parachute assembly attached by a bridle line to the base at a base pin. A time fuze at the forward end of the windshield activates an expulsion charge capable of separating the windshield from the parachute housing. A deployment spring attached between the base and parachute housing at one side ejects the parachute assembly from a side of the parachute housing far away from the fins. Thus upon firing the projectile at an angle of from about 40° to about 85° and activating the expulsion charge with the time fuze, the shear pins separate the windshield from the parachute housing, eject the parachute assembly from the parachute housing away from the fins into a windstream and deploy the parachute, effecting a fins down, soft landing and recovery of the projectile.

11 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

NOSE-DEPLOYED PARACHUTE RECOVERY MODULE FOR GUN FIRING AND SOFT RECOVERY OF FINNED PROJECTILES

GOVERNMENTAL INTEREST

The invention described herein may be manufactured, used and licensed by or for the Government for Governmental purposes without the payment to us of any royalties thereon.

BACKGROUND OF THE INVENTION

1. Field of the Invention

The present invention relates to a nose deployed parachute recovery system to soft recover a finned projectile that was fired from a cannon such as an artillery piece, a tank or a mortar. More particularly, the invention pertains to an improved soft recoverable finned projectile that is fired from a smoothbore gun at maximum launch acceleration and corresponding high velocity, with little or zero spin rate. The system is most particularly useful in a 120 mm, fin-stabilized, nonspinning, high-g tank round.

It is often desired to non-destructively test the functioning of an artillery round which has been fired. Such testing is useful to check performance, launch environments and survivability. In this regard there would be a need to mount test equipment positioned in the nose section of a projectile and recover it after firing by soft landing the projectile after attaining a high apogee, and retrieve the test apparatus without damage.

2. Description of the Prior Art

It has long been desired to develop a parachute recovery system for a gun projectile, however, prior systems demonstrated a very low success rate, excessive weight and a limited useful gun firing environment. One parachute system for projectiles is disclosed in Statutory Invention Registration H150. However, this system is strictly for spin-stabilized, non-finned projectiles. In this prior art system, a high velocity test projectile is fired with a soft recovery system mounted in the projectile nose section. Such spin-stabilized, non-finned projectiles must be fired vertically and do not turn around. By its nature, a spin-stabilized projectile constantly gyroscopes and at its apogee, its nose is in the upward position and it stays in this upward position as gravity pulls the projectile back to earth. The spin-stabilized projectile does not turn-over at apogee and falls back towards earth base-end first, at which time a timing device causes the projectile nose to be jettisoned and a parachute to be deployed behind the falling projectile. The complete body section of the projectile is then soft recovered. Vertical firing of a fin-stabilized projectile with a nose mounted soft recovery system would result in the projectile turning-over at apogee and falling back towards earth nose first. Jettisoning the projectile nose and deploying a parachute into the windstream would cause a finned projectile to fly through the parachute and likely damage it. Hence, this system would not be feasible for finned projectiles since the fins would tangle and cut the parachute cords. Heretofore there were no known acceptable methods for testing performance of such a fin-stabilized, nonspinning projectile. In the present invention, a finned projectile is fired, usually in a non-vertical trajectory, and the parachute is deployed from the side, rather than the rear of the projectile. The parachute is sidewardly ejected while the projectile is still flying forward at a somewhat horizontal pitch, rather than vertically. The parachute then avoids the fins and opens when safely clear of them.

After firing, the projectiles are dimensionally unaltered and can be refired. The parachute soft recovery allows the projectile to be recovered in an essentially undamaged condition after firing, thus permitting the projectile to be examined for ruggedness. Such soft landings allow full dimensional, visual, and chemical residue analysis of the projectile. Onboard recorders can be used to measure gun bore telemetry parameters and the whole unit can be removed and reused for other tests with a short testing cycle.

The present invention allows projectile testing using full gun acceleration in all axes in the actual gun in which it will be used. This is advantageous since rail guns, air guns, and shock towers all have vastly different acceleration profiles. As an example, setback and balloting forces may be at the proper acceleration force level in a test piece, but the duration of the pulse may be wrong.

The nose-deployed parachute recovery module of this invention is an apparatus that mounts on the forward nose section of a finned projectile. This provides a technique of jettisoning a shielded parachute housing assembly sideways from the projectile nose into the incident windstream where it will be swept to the rear of the fins from which position the parachute can be opened safely and reliably. The soft recovery technique employing the nose-mounted parachute module in this invention involves firing the finned projectile at a high angle, for example 75° so that the projectile velocity is reduced by drag and gravitational forces to a relatively low level at which the parachute can be deployed without risk.

During this period of reduced projectile velocity the nose mounted parachute module is activated by a timer which initiates an expulsion charge which then jettisons the windshield and parachute housing assembly which houses a pre-packaged parachute in a deployment bag. An offset spring causes the parachute housing assembly to be ejected to the side where it is caught by the incident windstream and carried rearward behind the projectile fins. A long flexible steel cable attaches the pre-packaged parachute to the projectile nose section. When the line becomes taut the parachute is pulled out of the deployment bag and the parachute is safely and reliably deployed from a position behind the projectile fins. The parachute provides a low velocity, fin first, soft landing for the projectile payload. This recovery technique can be used at a virtually unlimited projectile launch velocity since the projectile forward velocity can be reduced to the operational velocity levels of the parachute soft recovery system merely by adjusting the trajectory launch angle and a fuze timer setting.

The novel features of this invention, as well as the invention itself, both as to its organization and operation, will best be understood from the accompanying drawings, taken in conjunction with the accompanying description.

SUMMARY OF THE INVENTION

The invention provides a gun fired, artillery projectile and parachute recovery system having a cylindrical payload with a plurality of fin-stabilizers mounted at the rear end of the payload. A substantially conical nose section is at the forward end of the projectile. The nose section has a base attached to a hollow, substantially conical windshield with a plurality of frangible shear pins. The windshield encloses a hollow, substantially conical parachute housing containing a parachute assembly. The parachute assembly is attached by a bridle line to the base at a base pin. A time fuze is mounted at the forward end of the windshield and is capable of activating an expulsion charge formed between the forward end of the windshield and the parachute housing and is located below said time fuze. The charge is capable of separating the windshield from the parachute housing upon activating the expulsion charge. A deployment spring is attached between the base and the parachute housing at one side thereof. The spring is capable of ejecting the parachute assembly from a side of the parachute housing distant of the fin-stabilizers after activating the expulsion charge. Means are also provided for attaching the nose section to the payload.

The invention also provides a method of recovering a gun fired, artillery projectile which comprises, providing the above described gun fired, artillery projectile and parachute recovery system and firing it at an angle of from about 40° to about 85° to the horizontal. Activating the expulsion charge with the time fuze causes a shearing of the shear pins, separating the windshield from the parachute housing and ejecting the parachute assembly from the parachute housing away from the fin-stabilizers into a windstream thus deploying the parachute assembly. Finally a fin-stabilizer down, soft landing and recovery of the projectile is achieved.

DETAILED DESCRIPTION OF THE PREFERRED EMBODIMENT

Figure 1:
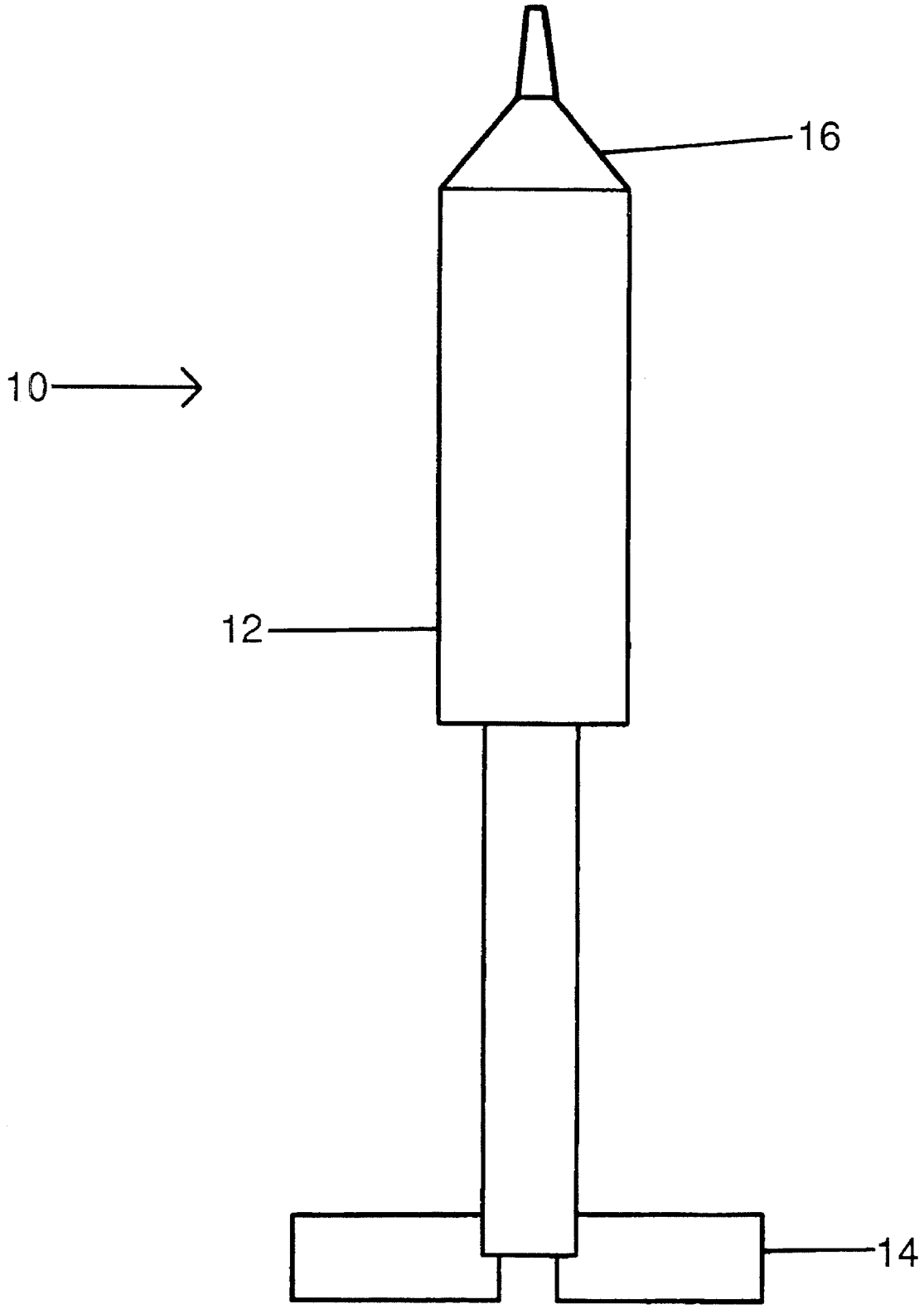
FIG. 1 shows a schematic view of the gun fired, artillery projectile according to the invention.
Figure 2:
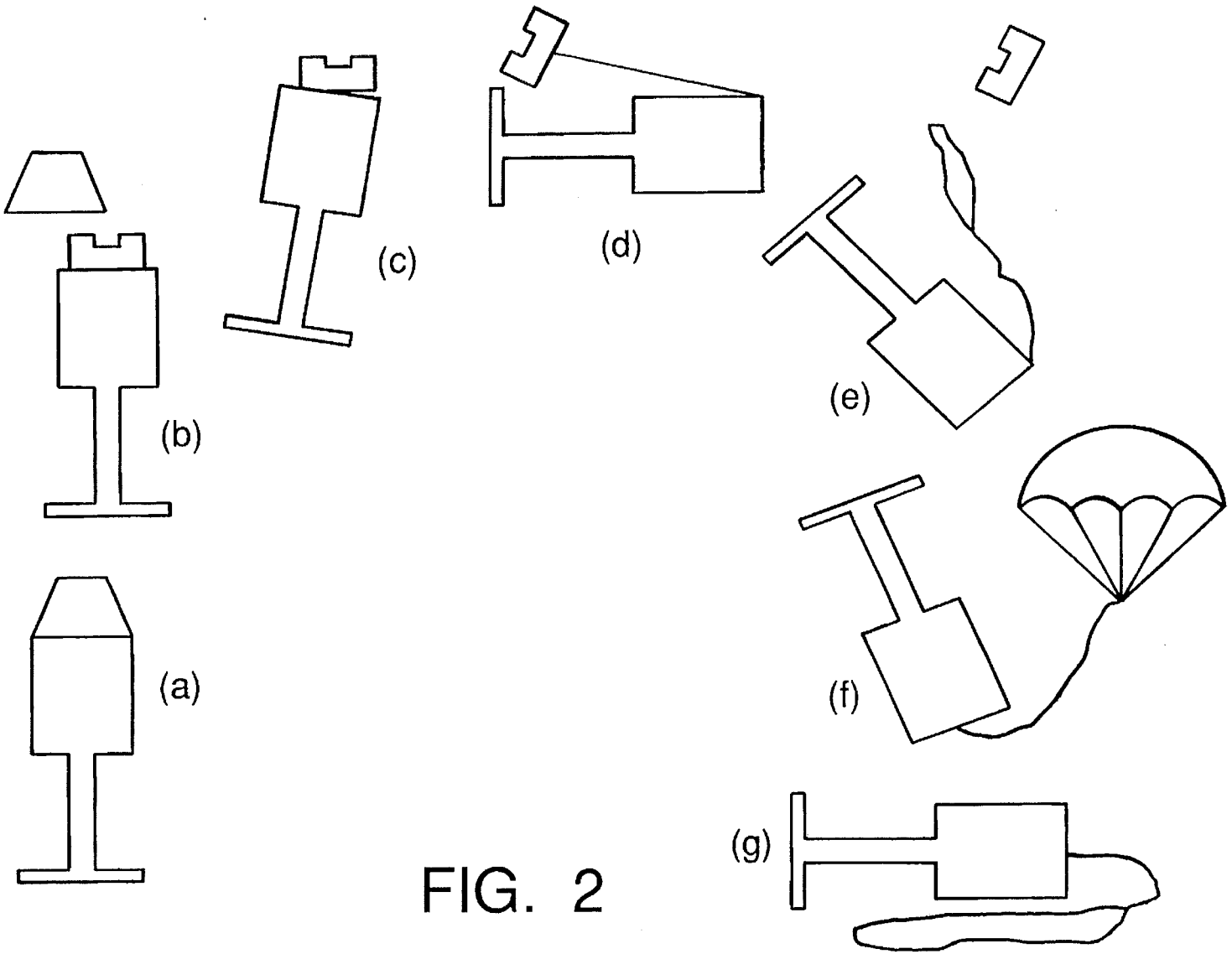
FIGS. 2(*a*) through 2(*g*) show a schematic representation of the launching and recovery sequence of the projectile and parachute recovery system according to the invention.
Figure 3:
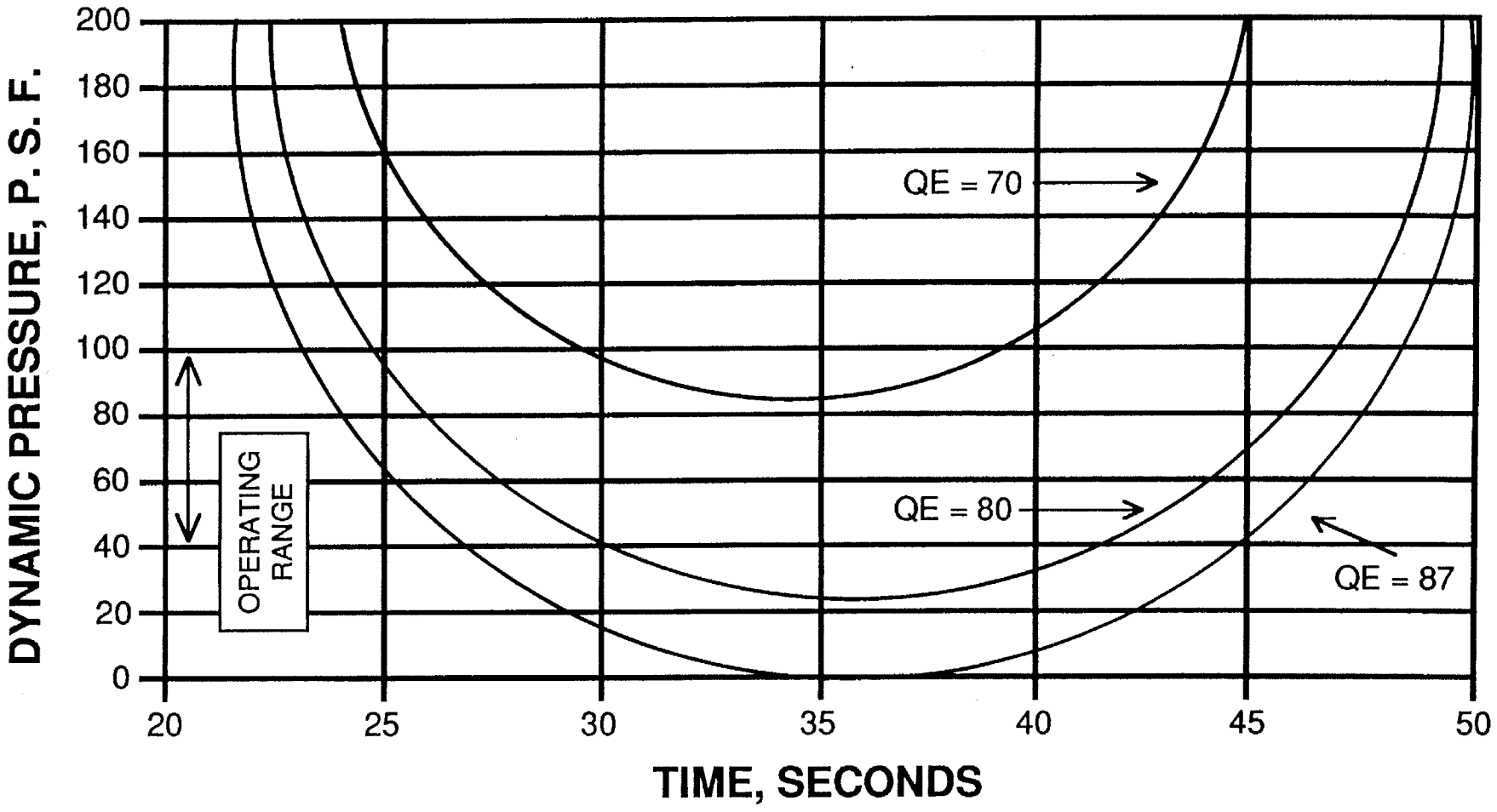
FIG. 3 shows a graph of parachute pressure loading as a function of launch angle and fuze activation time.

Referring to the drawings, FIG. 1 shows a schematic view of the gun fired, artillery projectile 10 according to the invention. The projectile has a payload section 12, a plurality of fins 14, and a parachute recovery module 16. FIGS. 2(*a*) through (*g*) show the launching and recovery sequence of the projectile. In FIG. 2(*a*) the artillery projectile is first launched. As shown in FIG. 2(*b*) the windshield of the nose section is ejected upon activation of an expulsion charge as hereinafter described. FIG. 2(*c*), shows an internal coil spring tilting the parachute housing to one side. In FIG. 2(*d*) the parachute assembly is jettisoned far away from the fin stabilizers of the projectile. FIG. 2(*e*) shows the parachute opening well clear of the fin stabilizers. FIG. 2(*f*) shows an opened parachute slowing the rate of descent of the payload. FIG. 2(*g*) shows the payload soft recovered on the ground. FIG. 3 depicts a graph of time from projectile launch until fuze activation vs. dynamic pressure on the parachute for three gun launch elevations, i.e. Quadrant Elevations (QE). Dynamic pressure is the pressure exerted on the parachute by the windstream force. The total force on the parachute= drag area×dynamic pressure. A preferred operating range for dynamic pressure on the parachute is from about 40 to about 100 pounds per square foot. A higher dynamic pressure causes the parachute canopy and cords to be too tight and increases the likelihood of breakage. With a lower dynamic pressure, the parachute is less likely to deploy and open cleanly. A preferred time for fuze engagement is from about 25 to about 45 seconds from launch.

Figure 4:
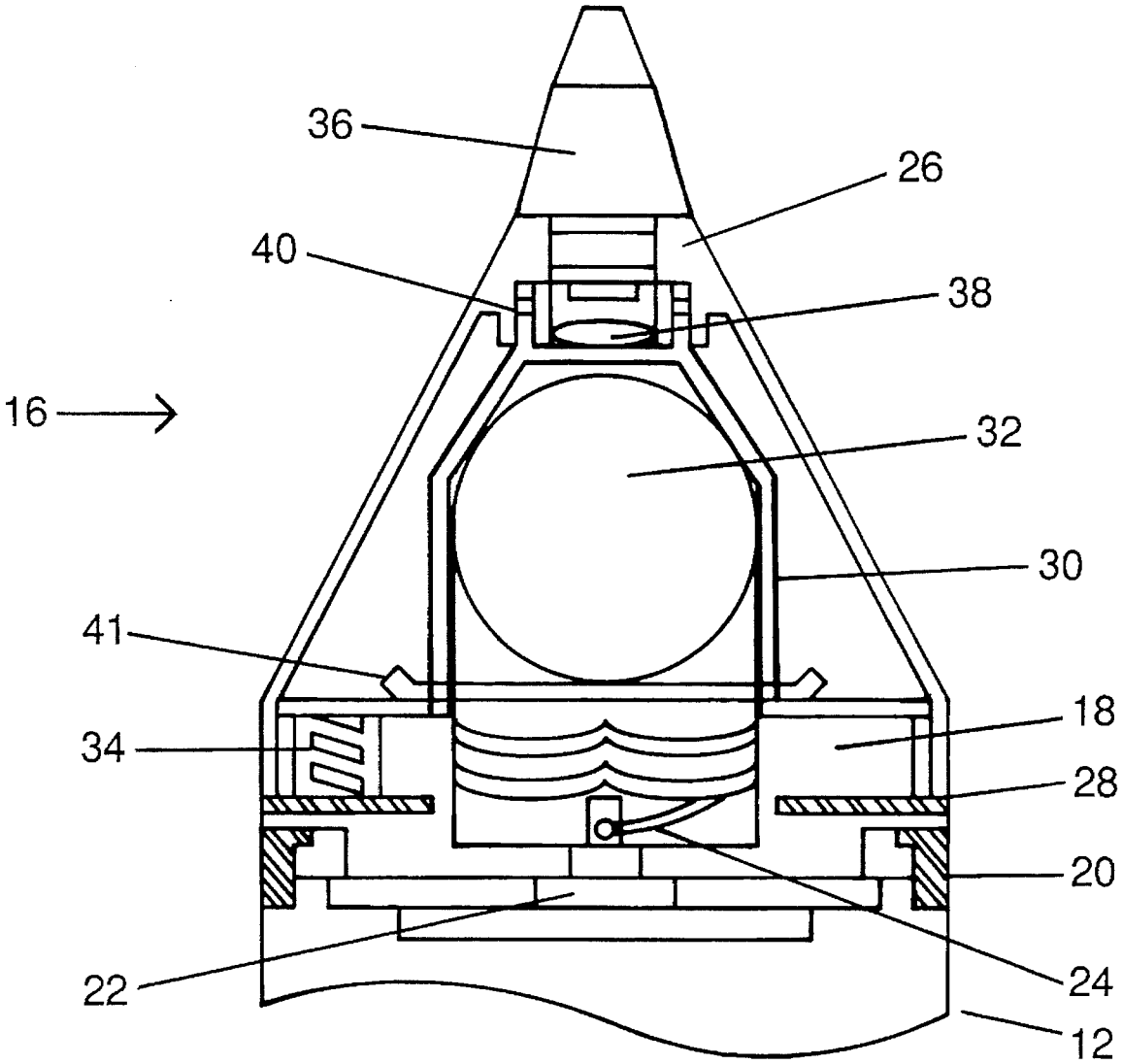
FIG. 4 shows a side view in partial section of the projectile and parachute recovery system according to the invention.
Figure 5:
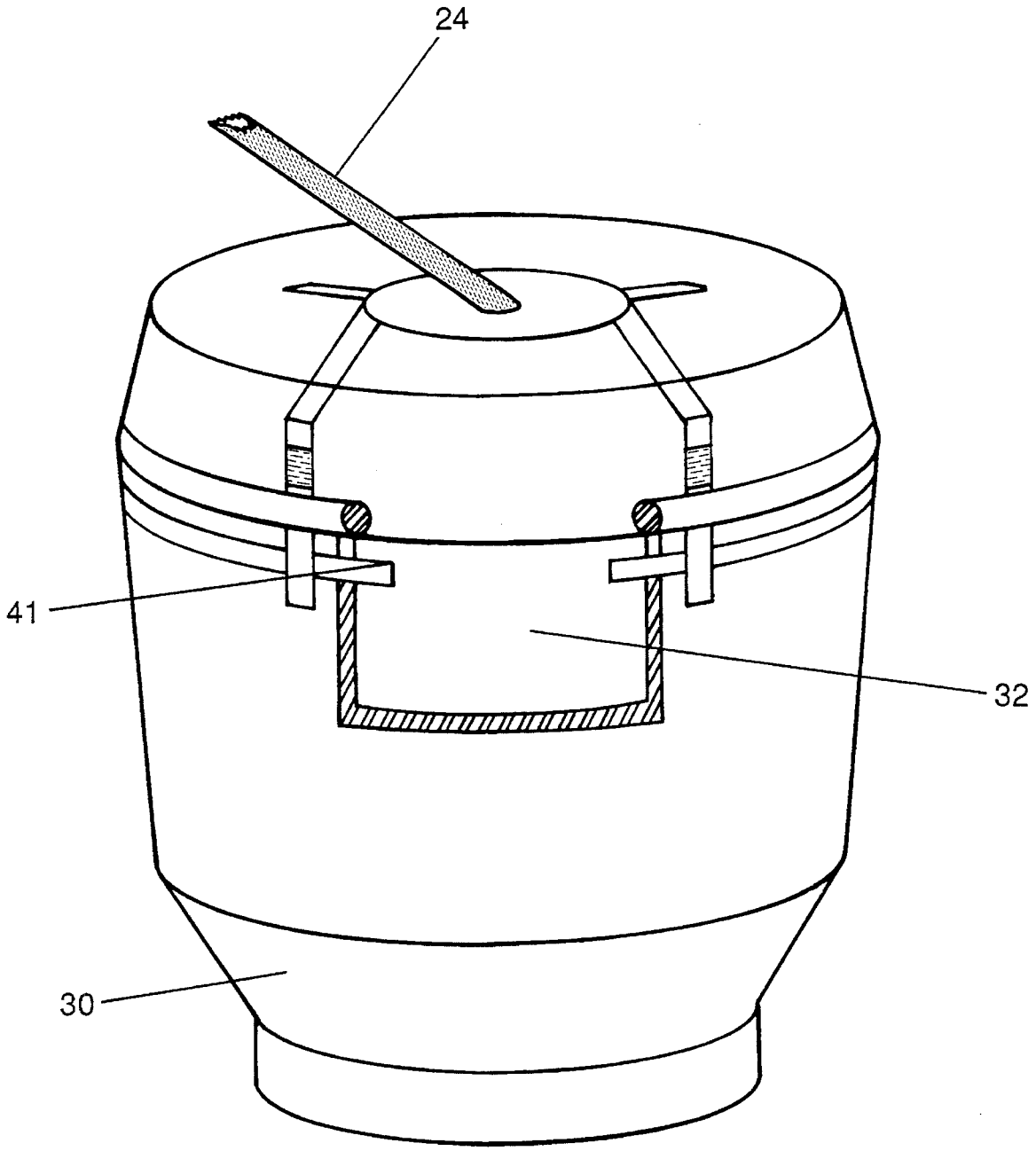
FIG. 5 shows a side view in partial section of the parachute housing used as part of the invention.

FIG. 4 shows a side view in partial section of the projectile and parachute recovery system according to the invention. The system has a payload section 12 onto which the parachute module 16 is mounted. Module 16 comprise a base 18 having a threaded section for attachment to the payload 12 by a threaded collar 20. The base 18 has a base pin 22 mounted on it which provides the attachment point for a flexible steel cable 24 to the base 18. The cable 24 is attached at its other end to a parachute assembly as hereinafter described. A windshield 26 is attached to the base 18 with a number of shear pins 28. In the usual case there are twelve shear pins attaching the windshield 26 to base 18. The shear pins 28 are made from commercial steel roll pin. The restraining pins 28 are sheared when the expulsion charge 38 is ignited by the time fuze. Shear pins 28 are constructed to break away at the appropriate time to allow the separation of the windshield 26 and the base 18. Windshield 26 encloses a parachute housing 30 containing parachute assembly 32. Parachute assembly 32 consists of a parachute canopy packed in a deployment bag, a swivel, and customary shroud lines. It is connected by steel cable 24 to the base 18. The canopy of the parachute is stowed in an inner compartment of the deployment bag and the parachute shroud lines in an outer compartment in order to provide controlled deployment of the parachute. The cable line 24 is attached to the base pin 22 using a cable crimp and it is coiled in the well of the base 18 upon assembly. The swivel aids in the coiling and uncoiling of the cable and also decouples the parachute from the payload if the payload has a spin. The parachute provides the payload 12 with the terminal, i.e. ground impact velocity required for a soft recovery. Parachute assembly 32 is packed in the deployment bag which is mechanically attached to the parachute housing 30 by means of looped tabs and wires 41 as best shown in FIG. 5.

On one side of the base 18 adjacent to the windshield is spring member 34. Spring 34 is a conventional coil spring that is compressed during assembly of the parachute module. When the windshield 26 is jettisoned, the spring 34 tilts parachute housing 30, with pre-packaged parachute assembly 32 to the side where it is caught by the windstream and swept to the rear of the projectile fins 14. A modified fuze 36 is mounted to windshield 26 at its forward end by a standard fuze thread. The modified fuze 36 is a standard M776/DM 93 mechanical time fuze with its charge cup and expulsion charge removed, but the time fuze can be any standard artillery time fuze. Under the modified fuze 36 is an expulsion charge 38. The expulsion charge 38 is a specially sized quantity of black powder propellant which when ignited by the time fuze will generate gas pressure to separate the windshield 26 from the base 18 which remains attached to the payload 12. The expulsion charge may consist of 10 grams of fine flake black powder which is packaged in a plastic bag. The charge is ignited by the time fuze. A propellant cup houses the expulsion charge and it screws onto the bottom of the time fuze. The propellant cup has a number of vent holes to release the gas pressure generated to windshield 26 and parachute housing 30. An O-ring 40 provides a gas seal between the parachute housing 30 and the windshield 26 in the close fitting cylindrical sections of the two parts. In operation, parachute module 16 mounts on the forward section of the projectile, replacing the ogive section of a standard finned projectile. The expulsion charge 38 is placed in a fuze well between the windshield 26 and parachute housing 30. The modified fuze 36 is screwed onto the windshield and the fuze is set for its function time. The projectile is operated by setting the time fuze and ramming the projectile into a gun, which is then elevated to the desired firing angle. The gun is then fired which actuates the setback and spin safety detents of the time fuze. The projectile is slowed by air resistance and gravity. Preferred firing angles may range from about 40° to about 85° to the horizontal; or more preferably from about 45° to about 75° to the horizontal. The weapon is fired remotely with all personnel under cover. The setback actuated time fuze starts when the projectile is fired. The time fuze is set to function when the projectile velocity is within the operational velocity levels of the parachute system. The time fuze initiates the expulsion charge 38 and the pressure generated by the charge acts between the parachute housing 30 the windshield 26, causing the windshield to move forward and shear off the shear pins 28 holding it to the base 18. As the windshield 26 is jettisoned off the nose of the finned projectile, the parachute housing 30 containing the parachute assembly 32 is pitched to the side by the offset spring 34, and is swept to the rear of the projectile fins by the incident windstream. When the parachute cable line 24 is pulled taut, the parachute is stripped from the deployment bag (which is attached to the parachute housing 30) from a position behind the projectile fins avoids damage to the parachute canopy and shroud lines by the fins. The resultant parachute retarded descent results in a fin-first ground impact of the payload at a relatively low velocity for a soft recovery of the payload. In the most preferred embodiment, the permitted weight allotment available in the nose section of the projectile is approximately four pounds.

This invention incorporates nested, conical structural parts, provides several advantages. It has a ballistic shape similar to the ogive section it replaces. The test projectile has the same aerodynamic loading as the parent projectile and no special spotting projectile is required. A match of the weight of the ogive section it replaces provides similar structural loading to the projectile payload. A match of the total desired launch weight allows use of the standard propelling charges. The module has no explosives until fuze and expulsion charge are assembled just prior to firing and therefore it is safer to use. The time fuze is a standard existing ordinance item which has built in safe and arm mechanisms. Conventional fuze tools can be used and conventional setting methods and fuze reliability can be realized. There is a controlled parachute deployment since the parachute is protected by a metal parachute housing until it is released behind the fins. A deployment bag controls the opening sequence of the parachute, i.e. lines first and canopy second in the proper way. It is to be understood that the above description and the accompanying drawings are merely illustrative of the preferred embodiments of the parachute recovery system for projectiles of the present invention, and that no limitations are intended other than as defined in the appended claims.

What is claimed is:

1. A gun fired, artillery projectile and parachute recovery system which comprises:

a.) a cylindrical payload having a plurality of fin-stabilizers mounted at the rear end of said payload;

b.) a substantially conical nose section at the forward end of the projectile; said nose section having i.) a base attached to a hollow, substantially conical windshield with a plurality of frangible shear pins, said windshield enclosing a hollow, substantially conical parachute housing containing a parachute assembly; said parachute assembly being attached by a bridle line to the base at a base pin;

ii.) a time fuze mounted at the forward end of said windshield capable of activating an expulsion charge formed between the forward end of said windshield and the parachute housing and located below said time fuze; said charge being capable of separating the windshield from the parachute housing upon activating the expulsion charge;

iii.) a deployment spring attached between said base and said parachute housing at one side thereof, said spring being capable of ejecting the parachute assembly from a side of the parachute housing distant of the fin-stabilizers after activating the expulsion charge;

c.) means for attaching said nose section to the payload.

2. The gun fired, artillery projectile and parachute recovery system of claim 1 wherein the means for attaching said nose section to said payload is a threaded attachment collar.

3. The gun fired, artillery projectile and parachute recovery system of claim 1 wherein the projectile is a 120 mm, fin-stabilized, nonspinning projectile.

4. A method of recovering a gun fired, artillery projectile which comprises, I.) providing a gun fired, artillery projectile and parachute recovery system which comprises:

a.) a cylindrical payload having a plurality of fin-stabilizers mounted at the rear end of said payload;

b.) a substantially conical nose section at the forward end of said projectile; said nose section having i.) a base attached to a hollow, substantially conical windshield with a plurality of frangible shear pins, said windshield enclosing a hollow, substantially conical parachute housing containing a parachute assembly; said parachute assembly being attached by a bridle line to the base at a base pin;

ii.) a time fuze mounted at the forward end of said windshield capable of activating an expulsion charge formed between the forward end of said windshield and the parachute housing and located below said time fuze; said charge being capable of separating the windshield from the parachute housing upon activating the expulsion charge;

iii.) a deployment spring attached between said base and said parachute housing at one side thereof, said spring being capable of ejecting the parachute assembly from a side of the parachute housing distant of the fin-stabilizers after activating the expulsion charge;

c.) means for attaching said nose section to said cylindrical payload; and

II.) firing said projectile at an angle of from about 40° to about 85° to the horizontal;

III.) activating the expulsion charge with the time fuze, thus causing a shearing of the shear pins, a separating of the windshield from the parachute housing and ejecting the parachute assembly from the parachute housing distant of the fin-stabilizers into a windstream thus deploying the parachute assembly; and IV.) effecting a fin-stabilizer down, soft landing and recovery of the projectile.

5. The method of claim 4 wherein the means for attaching said nose section to said cylindrical payload is a threaded attachment collar.

6. The method of claim 4 wherein the projectile is a 120 mm, fin-stabilized, nonspinning projectile.

7. The method of claim 4 wherein the projectile is fired at an angle of from about 45° to about 75° to the horizontal.

8. The method of claim 4 wherein the nose section weighs from about three to about five pounds.

9. The method of claim 4 wherein the nose section weighs about four pounds.

10. The method of claim 4 wherein the time from firing said projectile to the time of activating the expulsion charge with the time fuze ranges from about 25 to about 45 seconds.

11. The method of claim 4 wherein the dynamic pressure exerted by the windstream on the deployed parachute assembly ranges from about 40 to about 100 pounds per square foot.

* * * * *